(12) United States Patent
Ho et al.

(10) Patent No.: US 10,760,764 B2
(45) Date of Patent: Sep. 1, 2020

(54) PARTIAL METALLIZATION OF MOLDED PART USING ABLATION

(71) Applicant: Valeo North America, Inc., Troy, MI (US)

(72) Inventors: Tung Ho, Troy, MI (US); Ziyi Li, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/024,237

(22) Filed: Jun. 29, 2018

(65) Prior Publication Data

US 2020/0003389 A1 Jan. 2, 2020

(51) Int. Cl.
| | |
|---|---|
| *F21S 43/20* | (2018.01) |
| *F21V 5/04* | (2006.01) |
| *B60Q 1/44* | (2006.01) |
| *B29C 45/16* | (2006.01) |
| *B23K 26/36* | (2014.01) |
| *F21S 41/275* | (2018.01) |
| *G02B 3/00* | (2006.01) |
| *F21W 103/35* | (2018.01) |
| *B29L 11/00* | (2006.01) |
| *B23K 26/352* | (2014.01) |

(52) U.S. Cl.
CPC .......... *F21S 43/26* (2018.01); *B29C 45/1679* (2013.01); *B60Q 1/44* (2013.01); *F21V 5/04* (2013.01); *B23K 26/352* (2015.10); *B23K 26/36* (2013.01); *B29C 2045/1698* (2013.01); *B29L 2011/0016* (2013.01); *F21S 41/275* (2018.01); *F21W 2103/35* (2018.01); *G02B 3/0031* (2013.01); *G02B 2003/0093* (2013.01)

(58) Field of Classification Search
None
See application file for complete search history.

(56) References Cited

U.S. PATENT DOCUMENTS

| | | | | |
|---|---|---|---|---|
| 5,061,341 | A * | 10/1991 | Kildal | B23K 26/18 216/65 |
| 5,728,994 | A | 3/1998 | Hutton | |
| 5,824,374 | A | 10/1998 | Bradley, Jr. et al. | |
| 5,925,069 | A | 7/1999 | Graves et al. | |
| 9,500,333 | B1 * | 11/2016 | Johnson | F21S 41/275 |

* cited by examiner

*Primary Examiner* — Elmito Breval
(74) *Attorney, Agent, or Firm* — Valeo North America, Inc.

(57) ABSTRACT

An optical element for a lighting device of an automotive vehicle. The optical element includes a first portion configured to transmit electromagnetic (EM) radiation therethrough, the EM radiation including visible wavelengths and an ablation process wavelength. Also included is a second portion configured to absorb at least the ablation process wavelength, the second portion being in contact with the first portion to define an ablation process boundary which separates a surface of the first portion from an adjacent surface of the second portion. A patterned optical coating is provided on the optical element such that the optical coating material is provided on at least a part of the surface of the second portion, but not provided on the surface of the first portion.

6 Claims, 6 Drawing Sheets

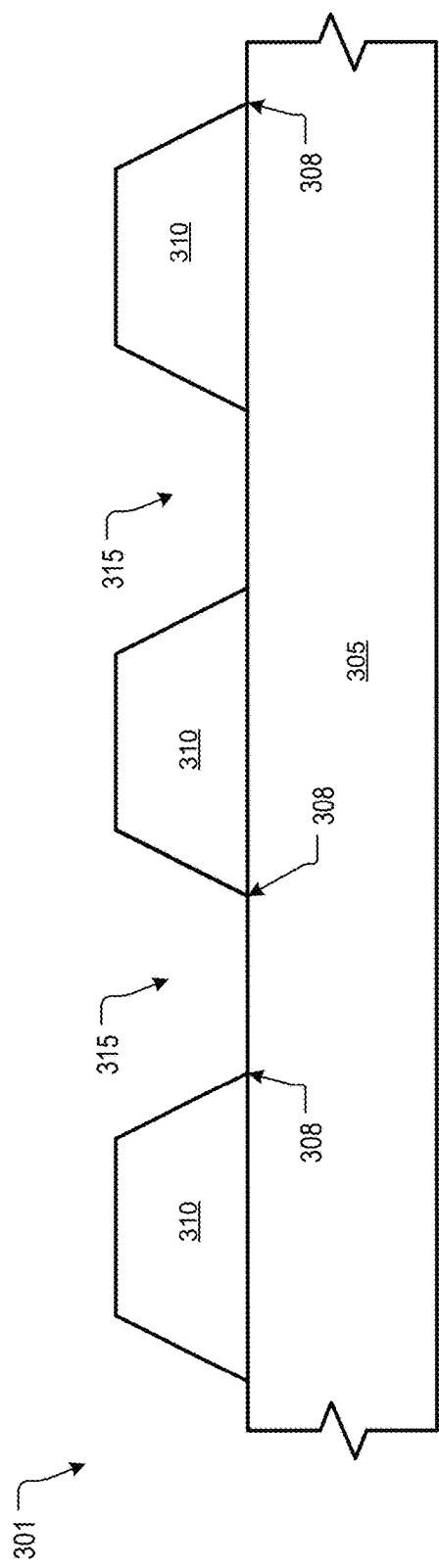
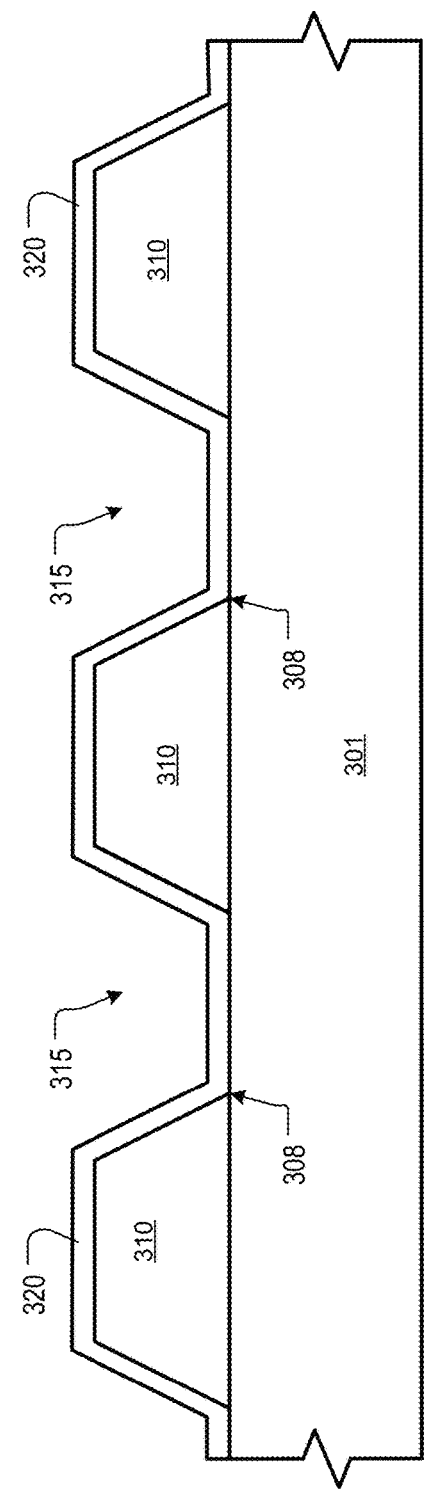
FIG. 3A
FIG. 3B

PARTIAL METALLIZATION OF MOLDED PART USING ABLATION

BACKGROUND

Field of the Disclosure

The present disclosure relates generally to light devices for automotive vehicles, and more particularly to light devices having a patterned coating for aesthetic appearance.

Description of the Related Art

Lighting devices of automotive vehicles traditionally include a light source and a lens, and may include a reflecting surface. When the lighting device is in an operative, or lit, state, light rays emitted from the light source are reflected by the reflecting surface and directed in a controlled direction through the lens. Often, an optical element within the lighting system is coated with a material that optically affects the light passing through the element. As one simple example, an opaque coating may be provided on portions of the lens to block light in such coated regions, while allowing light to pass through uncoated regions.

Recently, interest in the aesthetics of vehicle lighting devices has grown. In particular, consumer demand has shown a preference for complex shaped lighting devices that complement the style of the vehicle. Further, in addition to traditional vehicle lighting functions, consumers prefer stylistic lighting effects that are perceptible to the observer. The present inventors have discovered that such complex vehicle lighting devices are not easily produced from traditional coating processes.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

Accordingly, one object of the present disclosure is to overcome the above noted problems with conventional vehicle lighting. These and/or other objects of the present disclosure may be provided by the following example aspects of this disclosure.

Aspect (1) includes an optical element for a lighting device of an automotive vehicle. The optical element includes a first portion configured to transmit electromagnetic (EM) radiation therethrough, the EM radiation including visible wavelengths and an ablation process wavelength. Also included is a second portion configured to absorb at least the ablation process wavelength, the second portion being in contact with the first portion to define an ablation process boundary which separates a surface of the first portion from an adjacent surface of the second portion. A patterned optical coating is provided on the optical element such that the optical coating material is provided on at least a part of the surface of the second portion, but not provided on the surface of the first portion.

Aspect (2) includes the optical element of aspect (1), wherein first portion is clear and the second portion is opaque.

Aspect (3) includes the optical element of aspect (1), wherein the patterned optical coating is configured to provide at least one of absorption, reflection, refraction, and wavelength conversion of the visible wavelengths.

Aspect (4) includes the optical element of aspect (1), wherein the patterned optical coating is a metallized surface coating is configured to reflect visible light.

Aspect (5) includes the optical element of aspect (1), wherein an edge of the patterned optical coating is on the surface of the first portion in a vicinity of the boundary.

Aspect (6) includes the optical element of aspect (1), wherein the optical element is a lens including a base portion providing the first portion, and raised portions providing the second portion, the raised portions being formed on the base portion to form recesses where the base portion.

Aspect (7) includes the optical element of aspect (6) 6, wherein the raised portions include black plastic overmolding formed on the base portion which is transparent.

Aspect (8) includes a vehicle lighting device including a light source and the optical element of aspect (1) optically coupled to the light source such that light emitted from the light source is incident on the optical element.

Aspect (9) includes the vehicle lighting device of aspect (8), wherein the vehicle lighting device is brake lamp.

Aspect (10) includes a vehicle including a fastening device configured to mount the brake lamp of aspect (9).

Aspect (11) includes a method of forming an a lighting device of an automotive vehicle. The method includes forming a lens by a two shot molding process including injecting a first material into a mold to form a lens base, the first material being is transparent to visible light and ablation process light, and injecting a second material into the mold to form a lens feature made from a second material that absorbs at least the ablation process light, the lens feature being intermittently provided in direct contact with portions of the lens base such that a boundary is formed between exposed portions of the lens base and exposed portions of the lens feature. The method further includes forming a patterned coating on the lens such that the exposed portions of the lens base remain exposed and the exposed portions of the lens feature become covered with the coating material.

Aspect (12) includes the method of aspect (11), wherein the forming a patterned coating includes providing an optical coating material on a coated surface of the optical element covering the exposed portions of the lens base and the exposed portions of the lens feature.

Aspect (13) includes the method of aspect (12), wherein the forming a patterned coating includes providing ablating light incident on a surface of the optical element which is opposite to the coated surface.

Aspect (14) includes the method of aspect (13), wherein the forming a patterned coating further includes ablating the coating material from the exposed portion of the lens base.

Aspect (15) includes the method of aspect (11), wherein the injecting a first material includes injecting a clear plastic material into the mold to form the lens base.

Aspect (16) includes the method of aspect (15), wherein the injecting a second material includes injecting a black plastic material into the mold to form a black overmolding portion on the lens base.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3A is a schematic cross section of a two-shot molded part, such as a lens, prior to a patterned coating being formed thereon, according to an exemplary embodiment of the present disclosure;

FIG. 3B is a schematic cross section of a two-shot molded part, such as a lens, having a coating material thereon, according to an exemplary embodiment of the present disclosure;

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

As noted in the Background section above, the inventors discovered that conventional coating processes are not sufficient to meet consumer demand for stylistic vehicle light devices that provide unique effects that are perceptible to the observer. For example, it may be requested that a tail light or brake light have a striped appearance, appearing as a series of alternating illuminated and non-illuminated stripes when the lighting device is in use. One way to achieve such striped appearance is to provide stripe patterned coating on the lens of the lighting device in order to prevent a selected portion of the emitted light from being transmitted through the lens, thus giving the appearance of striped light. The opaque coated portion may also provide aesthetic appeal in an unlit state. For example, a metal coating may be used to block light during illumination, yet reflect ambient light to provide a chrome look during the day when the device is in an unlit state. Still further, it may be desirable to provide the coating pattern in positional relation to shaped features of the lens.

However, as molded optical elements and metal patterns become more complex and smaller in size, it becomes more difficult to provide the precise relative positioning desired. Thus, coating techniques applied to complex lighting devices can impact the aesthetic look of lighting devices in an unlit state, as well as cause inefficiencies and impact visual perception of the intended lighting effects.

Figure 1A:
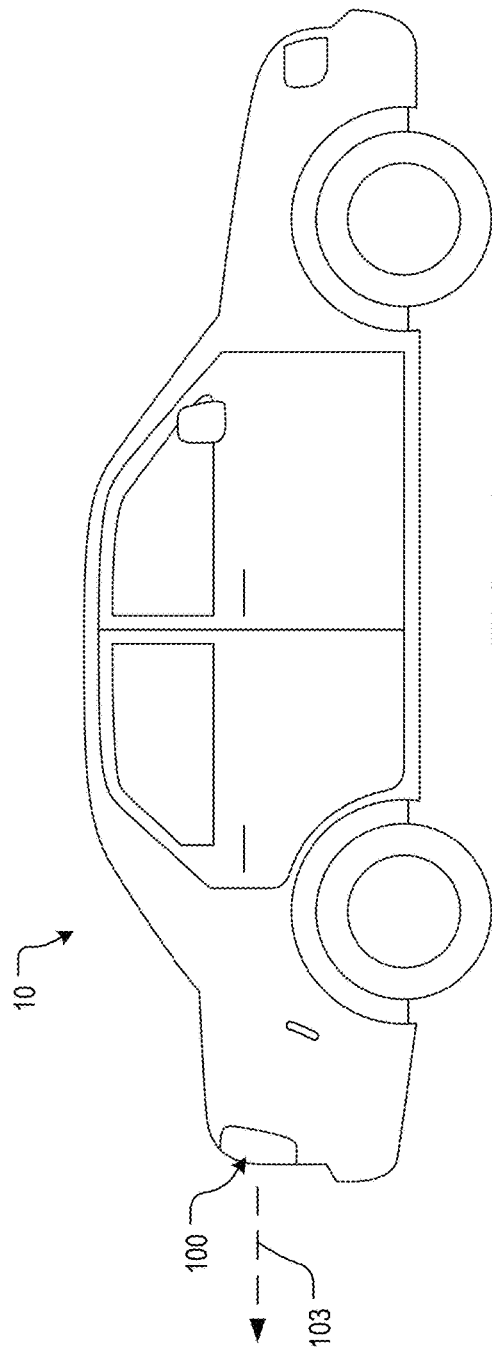
FIG. 1A is an illustration of an automotive vehicle, according to an exemplary embodiment of the present disclosure.

With reference to FIG. 1A, the present disclosure is generally related to automotive lighting. More specifically, FIG. 1A illustrates an automotive vehicle 10 with a rear lighting device 100. It can be appreciated that the lighting device 100 is merely representative and can be one of a variety of lighting devices of the automotive vehicle including, but not limited to, dipped-beam lamps, main-beam lamps, front fog lamps, cornering lamps, daytime running lamps, parking lamps, direction indicators, tail lamps, and stop lamps. In an embodiment, the lighting device 100 can be mounted to the automotive vehicle 10 either vertically or horizontally, and other shapes of the lighting device 100 may be used as appropriate. In an example, the rear lighting device 100 is a traditional automotive lamp.

Figure 1B:
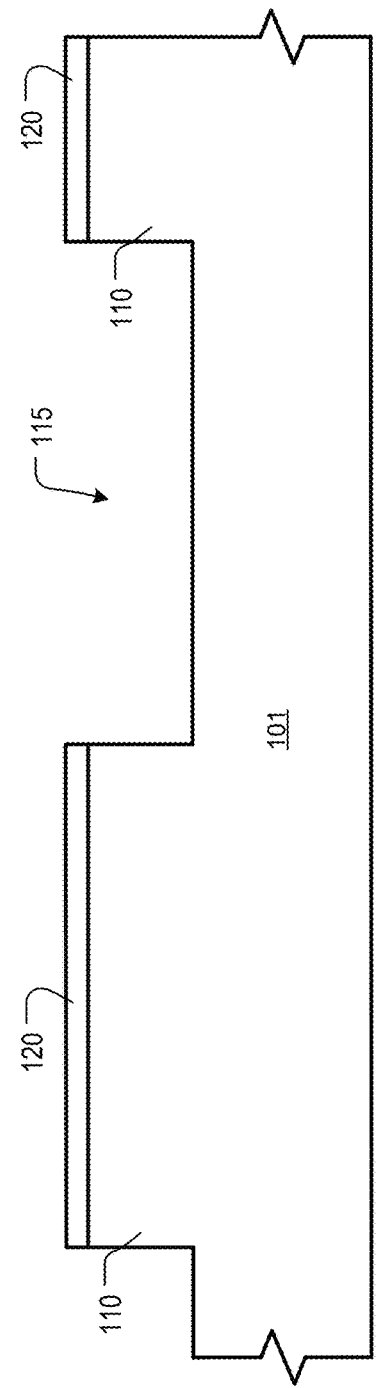
FIG. 1B is a cross-sectional view of a lens having both physical shaped feature and an optical feature placed in positional relation the shaped feature.

In one example, the rear lighting device 100 produces a visual effect from a front surface of the device 100, along a visual axis of an observer 103. Specifically, a light source may provide light that exits a lens of the device 100. FIG. 1B is a cross-sectional view of a lens having both physical shaped feature and an optical feature placed in positional relation the shaped feature. As seen, the lens 101 for a vehicle light 100 includes a raised portion 110 and a recessed portion to form a shaped feature in the lens 101.

As also seen in FIG. 1B, the lens 101 includes a coating 120 for providing an optical affect, and the coating 120 is aligned with the feature in the lens 101. That is, the coating 120 is positioned only on the raised portion 110 of the feature, while absent from the recess 115. The patterned coating 120 is typically performed by deposition of the coating material across the entire surface of the lens 101, and then removing the coating from the recess portions by laser ablating. The laser ablation process conventionally involves placing the coated lens 101 in a holding jig and providing a laser beam incident to the coated surface to remove the unwanted coating. The laser beam typically must be moved relative to the part in at least one of the x, y and z dimensions. Where the shaped feature of the lens 101 is a simple structure of relatively large dimensions (on the order of inches, for example), alignment of the coating 120 with the feature can be accomplished with conventional coating and patterning techniques. However, smaller or more complex features may be problematic.

Figure 2A:
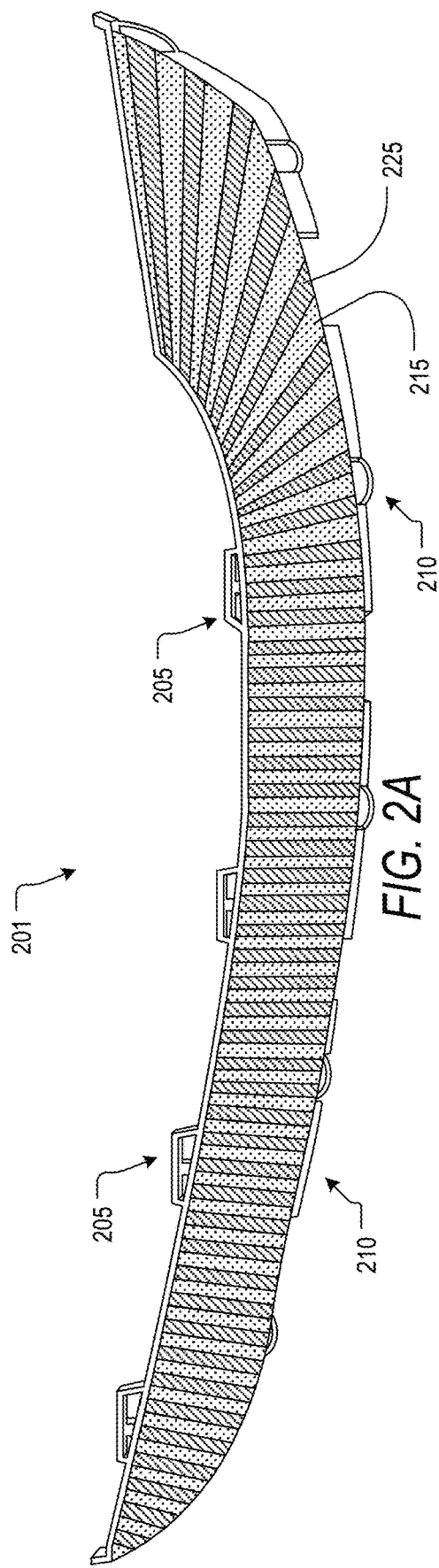
FIG. 2A is a cross-sectional view of a complex molded lens for a striped vehicle light, according to an exemplary embodiment of the present disclosure.

FIG. 2A is a view of a complex molded lens for a striped vehicle light, according to an exemplary embodiment of the present disclosure. As seen, the lens 201 includes alternating vertical stripes. In an embodiment, one vertical strip may be an 'on' stripe 215 while the adjacent vertical stripe is an 'off' stripe 225. In other words, when the striped vehicle light is illuminated, light should be transmitted through the 'on' stripe 215 for viewing by an observer, and the 'off' stripe 225 should appear as non-illuminated in the color of the material at the surface of the lens 201.

Figure 2B:
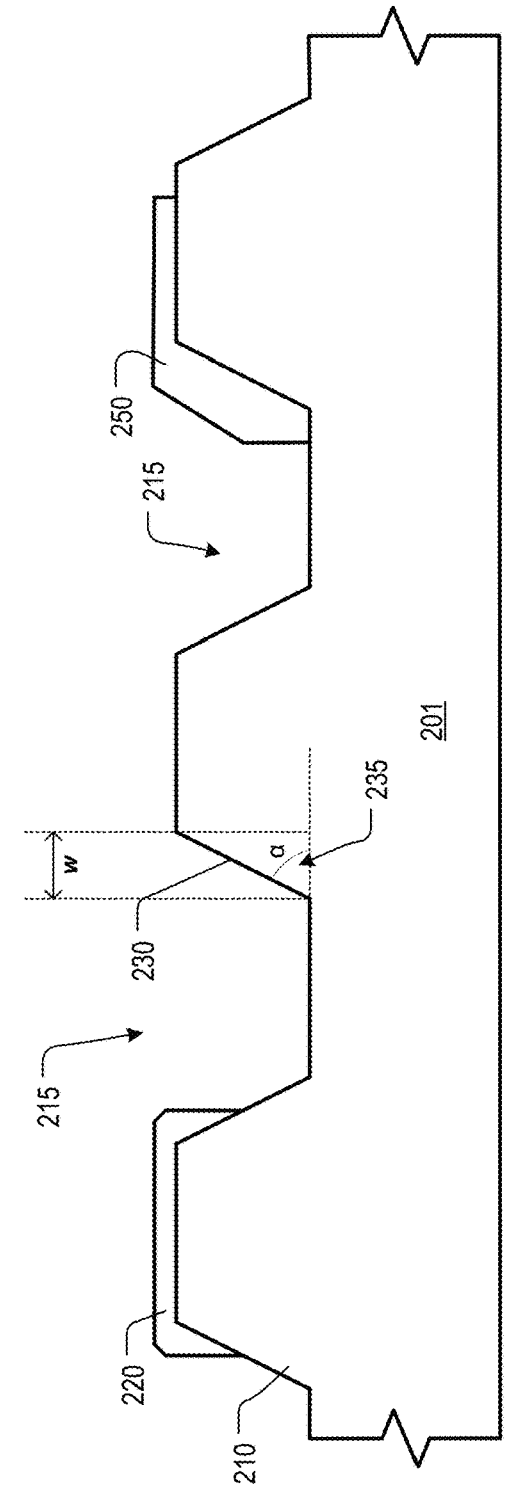
FIG. 2B shows a portion of a cross section of the lens of FIG. 2A.

FIG. 2B shows a portion of a cross section of the lens of FIG. 2A. As seen, the lens 201 is a molded component of homogeneous material having raised portions 210 and recessed portions 215 to form features in the lens 201. However, the features have relatively small dimensions that require molding process controls. For example, it is difficult to provide perfectly vertical sidewalls in the molding process, and may be undesirable from the standpoint of durability. Thus, as seen in FIG. 2B, feature sidewall 230 may have an angle α that causes a sloped sidewall having a width w. In one example, the angle α may be approximately 60° and the width w may be 0.5 mm. With dimensions such as these, it is difficult to provide the desired alignment of the coating boundary with conventional laser ablating techniques due to cumulative (or stacked) tolerances within the process.

For example, assuming that each of the molding process produces a lens having a feature dimensional tolerance of +/−0.2 mm, and the jig which holds the lens has a dimensional tolerance of +/−0.2 mm. Similarly, the XYZ table for moving the lens, and the laser beam pattern itself each have a tolerance of +/−0.2 mm. Assuming a normal distribution of each tolerance, these stacked tolerances provide a conventional laser ablation process range of +/−0.4 mm, which will result in very low yield in forming acceptable parts having the example dimensions noted in FIG. 2B above. More specifically, as seen in FIG. 2B, the process may produce an acceptable coating placement 220 aligned with the raised portion, but in many cases will produce a coating 250 which unacceptably exposes the raised portion and/or covers the recessed portion as shown. Expensive precision tooling would be required to fix such out of process conditions to achieve improved yield. Moreover, it is likely that visual aesthetics of even in-process will be negatively impacted.

Embodiments of the present invention provide a molded part such as a lens by a two shot process where a first shot provides a clear material and the second shot provides an opaque material that serves as a mask for an ablating process from a rear surface of the lens. During the ablation process, laser light enters from the rear surface, travel through the clear section of the lens to remove the metal film provided on a front side of the lens. However, the opaque section will block the laser so that the metallization on the front of the lens will not be removed.

FIG. 3A is a schematic cross section of a two-shot molded part, such as a lens, prior to a patterned coating being formed thereon. As seen, the lens 301 has raised portions 310 and recess portions 315 similar to the lens 201 of FIG. 2A. However the lens 301 is formed from a first molding shot portion 305 made of a material that is transparent, and a second molding shot portion 310 made from absorptive material. The first portion 305 is in direct contact with the second portion 310 such that an ablation process boundary 308 is defined, as will be discussed further below. In one embodiment, the second portion 310 is overmolded black plastic on clear plastic first portion 301 such that the black plastic provides masking of laser ablation light entering from an opposite side of the lens.

FIG. 3B is a schematic cross section of a two-shot molded part, such as a lens, having a coating material thereon. As seen, the coating material 320 completely covers the first and second portions 305, 310, as well as the ablation boundary 308. The coating 320 may be any material for providing a desired optical affect to visible light, such as light produced from the light source of a vehicle lighting device. For example, the coating may cause light from a light source to be at least partially reflected, refracted, absorbed, converted in wavelength etc. Further, the coating 320 may be any suitable material for providing any desired aesthetic affect in absence of any light source (e.g. ambient light). For example, the coating 320 may be colored, reflective etc. In one embodiment, the coating 320 is metallic to provide a chrome-like appearance in ambient light, and to block portions of light emitted from a light source.

Figure 4:
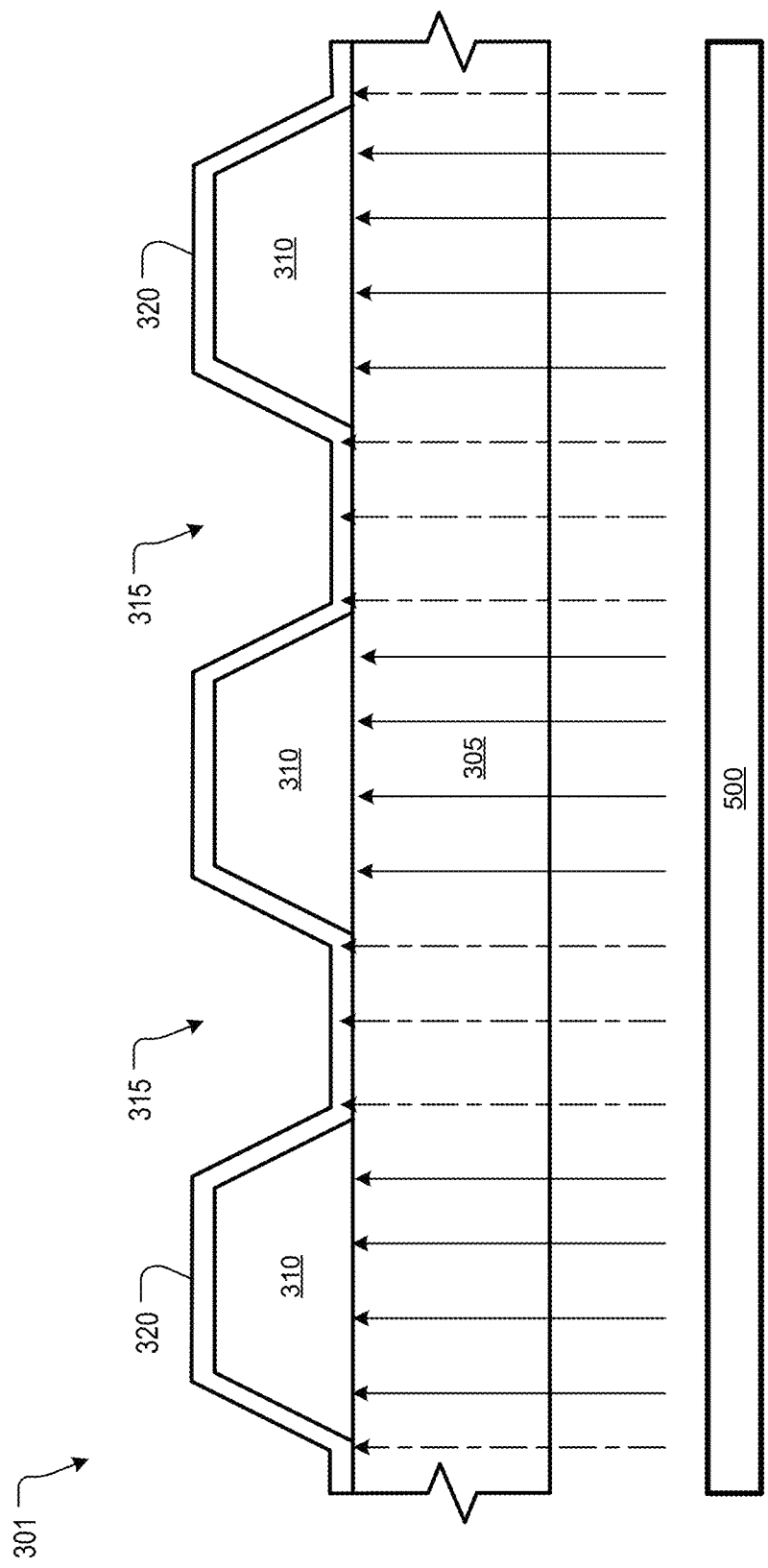
FIG. 4 is a schematic illustration of an ablation process for removing portions of the coating to form a patterned coating in accordance with embodiment of the present disclosure.

FIG. 4 is a schematic illustration of an ablation process for removing portions of the coating 320 to form a patterned coating in accordance with embodiment of the present disclosure. As seen, an ablating lamp 500 provides light rays incident on a backside of the lens 301 (i.e., a side opposite to the coating side of the lens). The ablating lamp 500 may be a single light source such as a UV or IR lamp, or a plurality of sources such as lasers arranged in a grid array. The ablation process light rays are transmitted through the first shot material, and preferably have no effect on this material 305. Light rays in the area of recesses 315 (shown by dashed lines) will reach the coating material 320 provided within the recess 315 and cause removal of the coating material 320 in these areas by vaporization etc. Thus, the coating material 320 and parameters of the light from the ablating lamp 500 (i.e. wavelength, intensity etc.) are selected such that the coating material 320 will be removed when the light is incident thereon.

Light rays in the area of the raised portions 310 (shown by solid lines) will reach the second portion material which blocks the light from being transmitted further to reach the coating material on the raised portions. Thus, the first portion material 310 and parameters of the light from the ablating lamp 500 (i.e. wavelength, intensity etc.) are selected such that the first portion 310 prevents removal of the coating 320 in the area of the raised portions.

Figure 5:
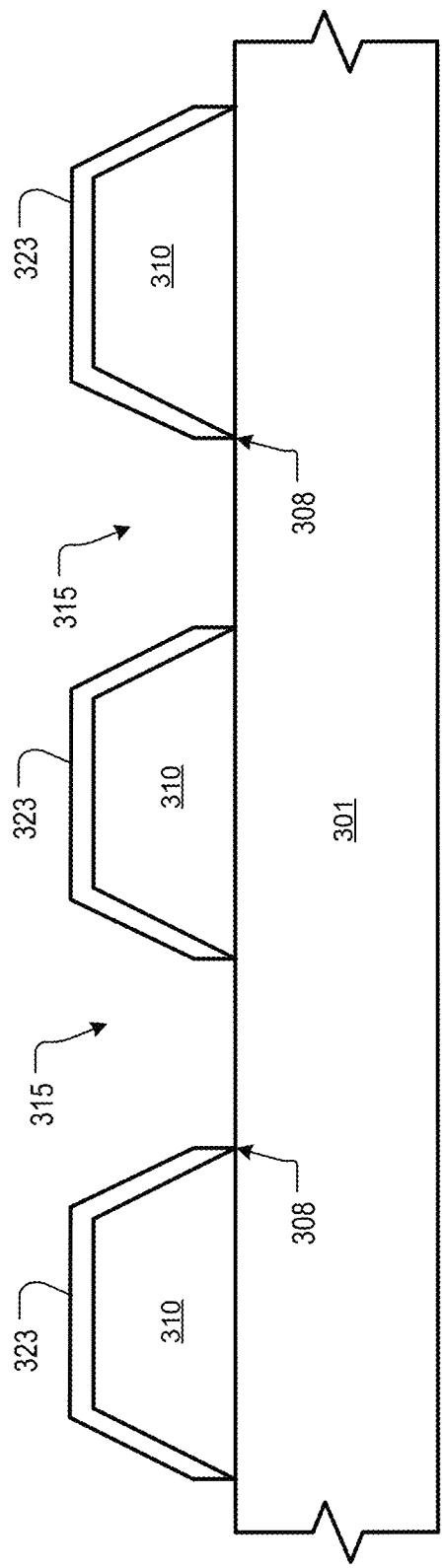
FIG. 5 is a schematic of a cross-sectional view of a partially coated lens according to an exemplary embodiment of the present disclosure.

FIG. 5 is a schematic cross section of a two-shot molded part, such as a lens, having a patterned coating material thereon. As seen, the patterned coating 323 covers the material of first portion 310, but stops at the boundary 308 where the transparent material 301 permitted the ablation light to remove the coating 320. Depending on the parameters of the ablation light used, and the characteristics of the first material 301 and second material 310, the coating material may be removed beyond the boundary 308, such as by heat vaporization. However, the termination of the coating material will be a consistently spaced from the boundary 308 thereby providing repeatable results across the lens surface.

Figure 6:
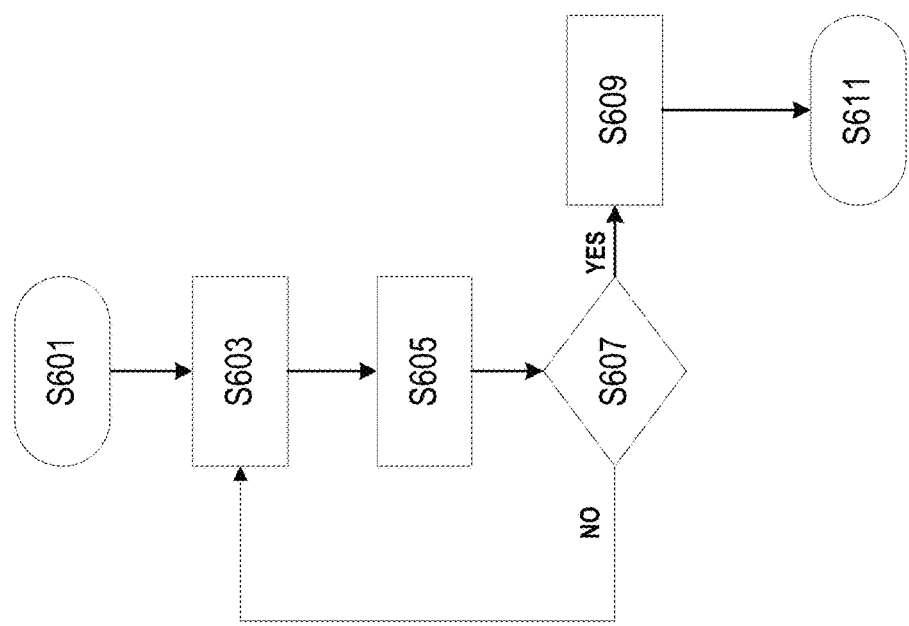
FIG. 6 is a flowchart of a method for ablating an optical part, according to an exemplary embodiment of the present disclosure.

FIG. 6 is a flowchart of a method for ablating an optical part, according to an exemplary embodiment of the present disclosure. The process begins in step S601 where an optical part having a full coating thereon is provided. In step S603, the an ablation light source provides ablation process light incident on a side of the optical part opposite to the coated side. The ablation process light is transmitted through the backside of the lens and becomes incident on the coating material provided on transparent regions of the coated surface, while being blocked by absorbing portions of the lens. S607 is a decision for determining whether the coating material has been removed from the intended surfaces. This can be determined manually by visual inspection or automatically by use of optical sensors, for example.

If it is determined in S607 that the coating material has not been removed from the intended surfaces, then the process returns to step S603 where the ablation light continues to be supplied incident to the rear surface of the lens. If, however, it is determined that the coating material has been removed as intended, the process continues to step S609 where the ablation light is removed from the lens, such as by turning off the light source. A patterned coating optical part is provided in step S611. This process provides high accuracy termination of metallization edge such that complex patterns can be provided on complex parts at small dimensions.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An optical element of an automotive vehicle's lighting device, comprising:
   a first portion configured to transmit electromagnetic (EM) radiation therethrough, said EM radiation comprising visible wavelengths and an ablation process wavelength;
   a second portion configured to absorb at least said ablation process wavelength, said second portion being in contact with the first portion to define an ablation process boundary which separates a surface of the first portion from an adjacent surface of the second portion; and
   a patterned optical coating provided on the optical element such that the optical coating material is provided on at least a part of the surface of the second portion, but not provided on the surface of the first portion, wherein
   the patterned optical coating is a metallized surface coating configured to reflect visible light,
   the optical element is a lens comprising a base portion providing said first portion, and raised portions providing said second portion, the raised portions being formed on the base portion to form recesses, and
   the raised portions comprise black plastic overmolding formed on the base portion, the base portion being transparent.

2. The optical element of claim 1, wherein the second portion is opaque.

3. The optical element of claim 1, wherein an edge of the patterned optical coating is on the surface of the first portion in a vicinity of the ablation process boundary.

4. A vehicle lighting device comprising a light source and the optical element of claim 1 optically coupled to said light source such that light emitted from the light source is incident on the optical element.

5. The vehicle lighting device of claim 4, wherein the vehicle lighting device is a brake lamp.

6. A vehicle comprising a fastening device configured to mount the brake lamp of claim 5 to the vehicle.

* * * * *